E. VAN WAGENEN.
BATTERY CHARGE INDICATOR.
APPLICATION FILED OCT. 22, 1908.
1,013,465.
Patented Jan. 2, 1912.
3 SHEETS—SHEET 1.
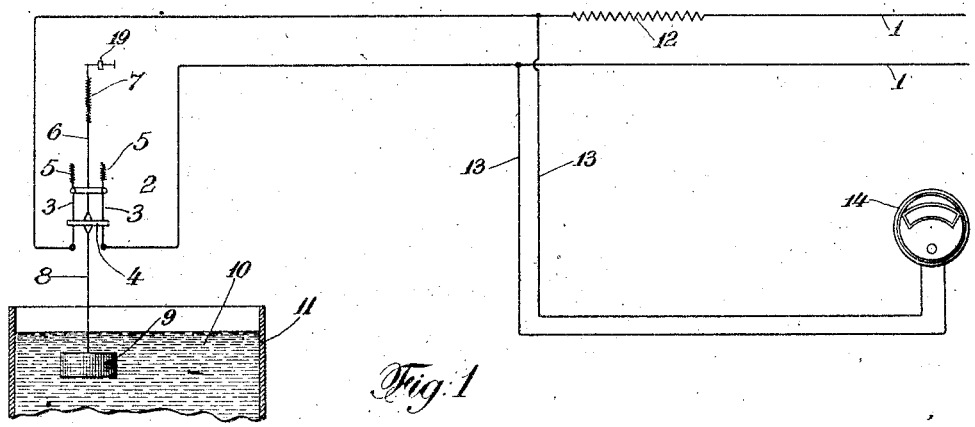
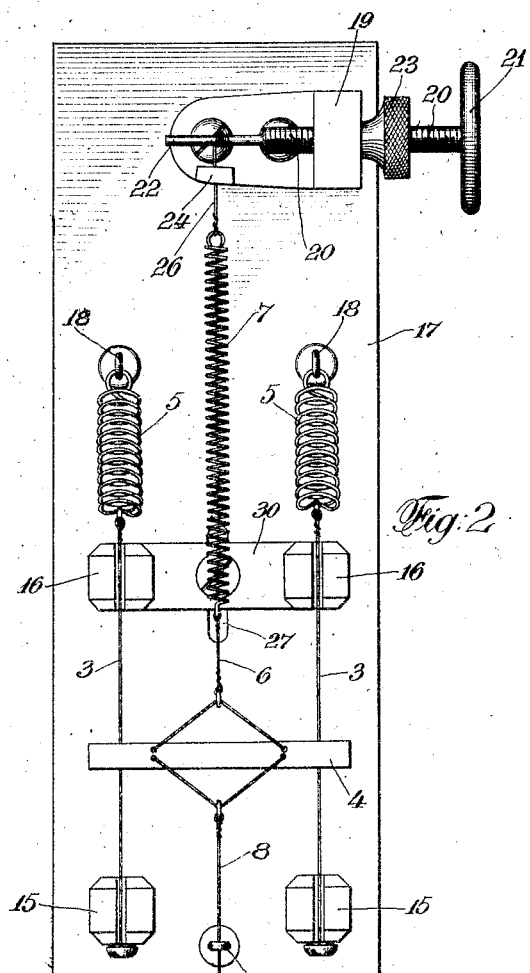
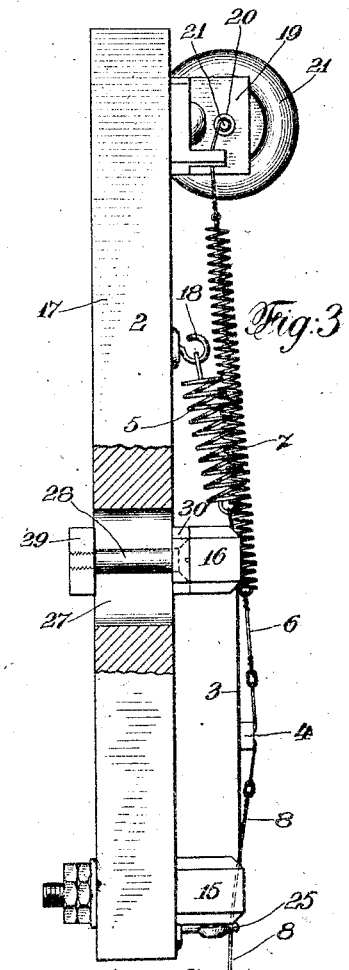
Witnesses:
John O. Gumper
[signature]
Edward Van Wagenen Inventor
By his Attorneys Kenyon & Kenyon E. VAN WAGENEN.
BATTERY CHARGE INDICATOR.
APPLICATION FILED OCT. 22, 1908.
1,013,465.
Patented Jan. 2, 1912.
3 SHEETS—SHEET 2.
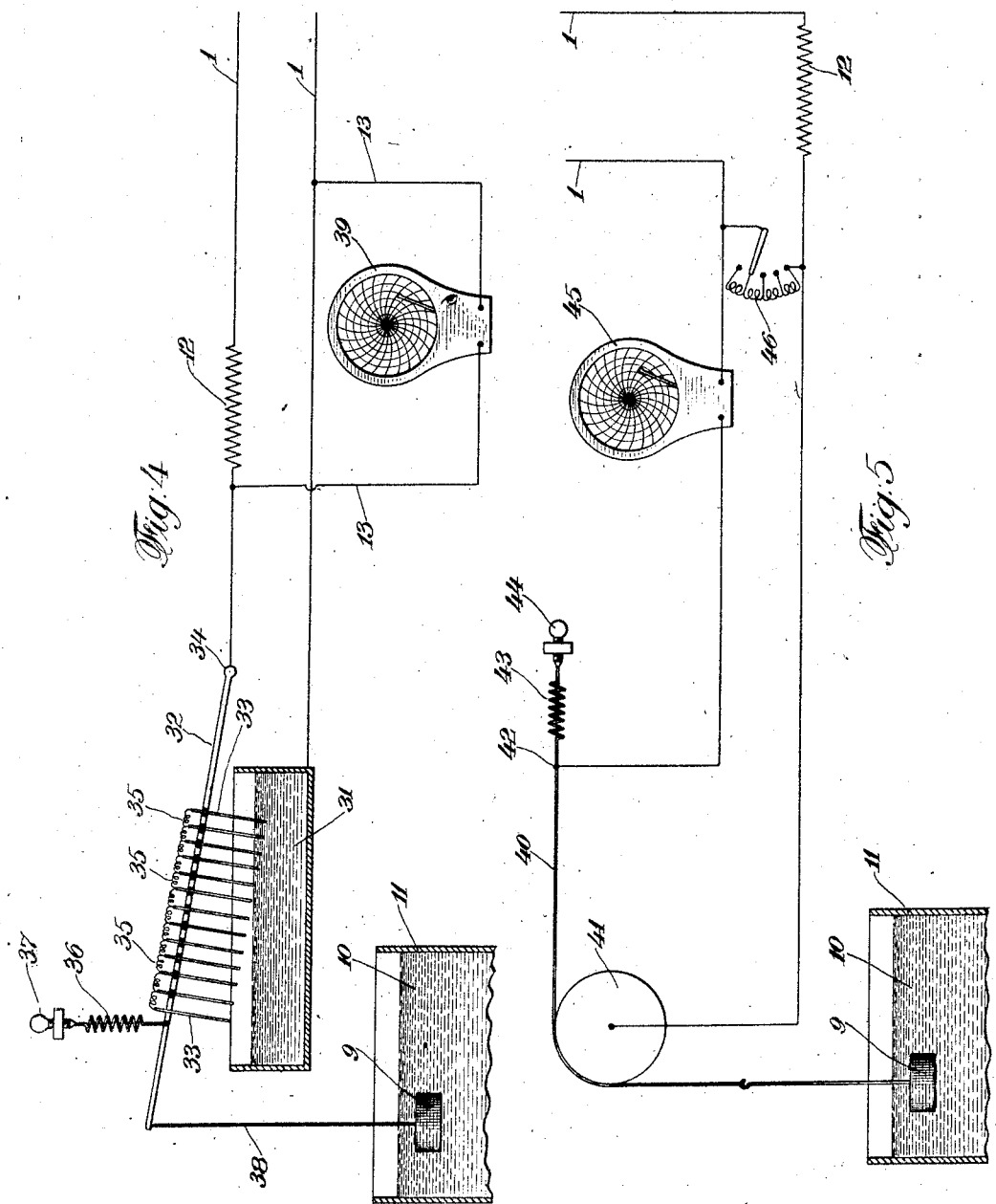

E. VAN WAGENEN.
BATTERY CHARGE INDICATOR.
APPLICATION FILED OCT. 22, 1908.
1,013,465.
Patented Jan. 2, 1912.
3 SHEETS—SHEET 3.
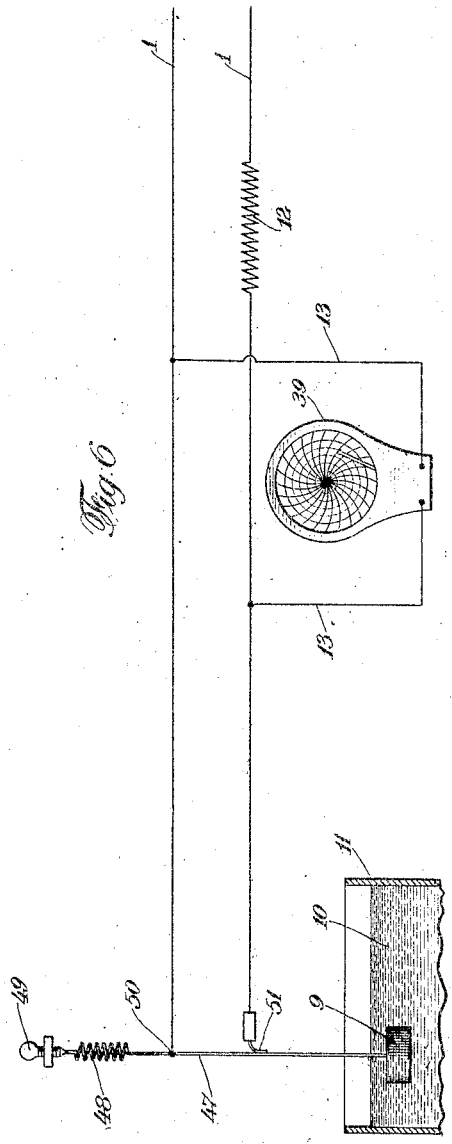
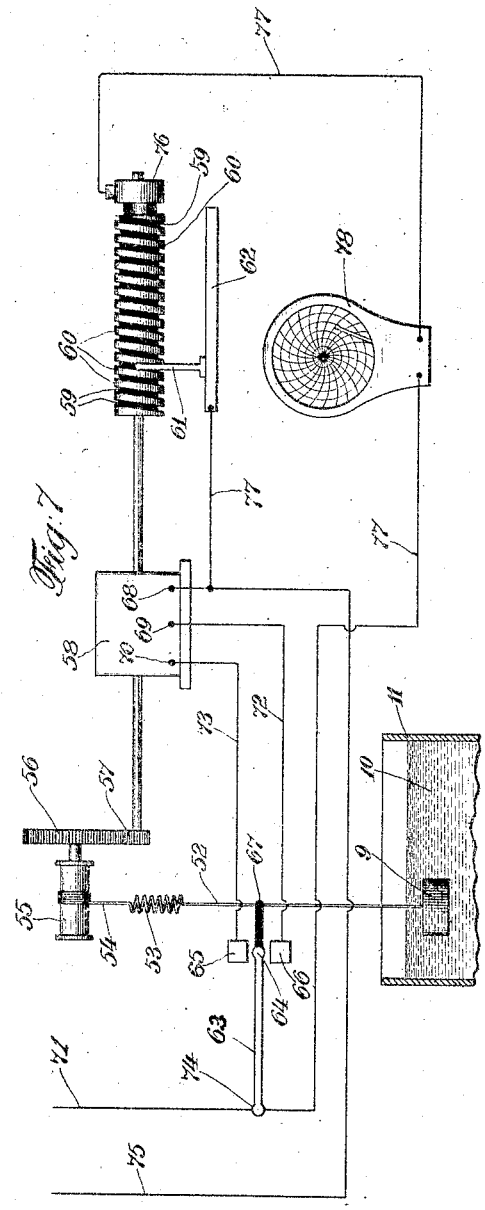
Witnesses:
Edward Van Wagenen
Inventor
By his Attorneys Kenyon & Kenyon

UNITED STATES PATENT OFFICE.

EDWARD VAN WAGENEN, OF NEW YORK, N. Y., ASSIGNOR TO GOULD STORAGE BATTERY COMPANY, A CORPORATION OF NEW YORK.

BATTERY-CHARGE INDICATOR.

1,013,465.   Specification of Letters Patent.   Patented Jan. 2, 1912.

Application filed October 22, 1908. Serial No. 458,973.

*To all whom it may concern:*

Be it known that I, EDWARD VAN WAGENEN, a citizen of the United States, and a resident of the city, county, and State of New York, have invented certain new and useful Improvements in Battery-Charge Indicators, of which the following is a specification.

My invention relates to improvements in battery charge indicators and has for its objects, the provision of arrangements by means of which the condition of charge of storage batteries may be ascertained at any time and in which the device indicating the condition of the battery charge may be placed at a remote distance from the battery itself. In prior devices it has been usual to place the indicator and all the appurtenant mechanism directly over the battery or at least very near to it in the battery room. Thus the mechanism is subject to the acid fumes of the battery which act upon the metallic parts of the mechanism causing corrosion and in a short time making the apparatus unfit for further use. Also in prior devices in which the indicating mechanism is near the battery in the battery room it is necessary for one to go into the battery room if one wishes to ascertain the condition of charge of the battery. If the battery is being watched by a dynamo attendant this may necessitate a long trip from the dynamo room to the battery room.

By my improvements the indicating apparatus is not only removed from the deteriorating acid fumes of the battery but the indicating apparatus may be placed in the dynamo room directly upon the main switchboard of a plant, or in any other convenient place, and it is not necessary for one to enter the battery room to ascertain the condition of charge of the battery. By my improvements one is also enabled to obtain a record showing the exact condition of charge at any moment, and the arrangements are conducive to economy and efficiency of operation and construction.

Further objects, features and advantages will more clearly appear from the detailed description given below taken in connection with the accompanying drawings which form a part of this specification.

In the drawings, Figure 1 shows diagrammatically an arrangement embodying one form of my improvements. Fig. 2 is a detail vertical front view of the variable resistance arrangement shown in Fig. 1. Fig. 3 is an edge view of the same, partly in section. Fig. 4 shows diagrammatically a modified arrangement embracing another embodiment of certain of my improvements. Figs. 5, 6 and 7 are similar views showing still further modified arrangements.

Referring to Fig. 1 the reference numerals 1, 1, represent a substantially constant potential electrical circuit. The potential or electromotive force is supplied thereto from any substantially constant source, as a suitable battery or generator, not shown. Connected in series in the circuit 1, 1, is a variable resistance device 2 having two high resistance wires 3, 3, connected in series by a member or bar 4 and held taut by springs 5. The member 4 is movable up and down the resistance wires 3, 3, and is supported by a wire 6 and spring 7. Suspended from the member 4 by a wire 8 is a displacer or hydrometer 9 which is adapted to hang within the liquid 10 of a cell or battery 11. In series with the variable resistance arrangement 2 in the circuit 1, 1, is a resistance 12 of the high temperature coefficient sort and which is designed to prevent an excess current in the circuit 1, 1. Between the resistance 12 and the variable resistance device 2, and in parallel with the latter is connected by the circuit 13, 13, a voltmeter 14. The voltmeter 14 may be of the ordinary variety or of the sort known as millivoltmeters.

Referring to the details of the variable resistance arrangement shown in Figs. 2 and 3, the high resistance wires 3 are each secured at one end to binding posts 15, 15, and it is at these ends that the terminals of the circuit 1, 1, are connected. The other ends of the wires 3, 3, are resiliently held upon the posts 16 by the springs 5 which are in turn secured to the base 17 by the screw eyes 18. At the upper end of the base 17 is a projecting support 19 which carries a thumb screw 20 having a thumb wheel 21 and a coiling spindle 22. The thumb screw 21 is locked in position by a thumb nut 23. A guiding projection 24 with a hole through it and a screw eye 25 are also provided. The wire 26 attached to the upper end of the spring 7 passes through the hole in the guiding projection 24 and is arranged to be coiled about the spindle 22. This guiding projection 24 and screw eye 25 are arranged to hold the wires 8 and 26 in the proper position to always maintain the member 4 in contact with the wires 3.

In operation, the condition of charge of the battery is indicated by the specific gravity of the liquid 10 in the battery and as the specific gravity of the liquid changes the displacer or hydrometer 9 is given more or less buoyancy and is caused to move up or down in accordance with those changes. These movements cause similar movements of the bar or member 4 thereby varying the lengths of wires 3, 3, which are in series in the circuit 1, 1. This varies the resistance of the circuit 1, 1, at the left of the resistance 12 and consequently varies the voltage across the circuit 13, 13, in accordance therewith. The voltmeter 14 indicates these changes and may be so graduated that the ampere hours charge or discharge given the battery may be directly read therefrom. By means of the thumb screw 20 the height of the member 4 may be adjusted to adjust the reading of the meter 14 in the first instance. The base 17 is provided with a slot 27 through which passes a bolt 28, carrying a nut 29. The bolt 28 is secured to a member 30 which carries the posts 16 so as to afford means for adjusting the latter, which may be secured in the proper position by means of nut 29.

Referring to Fig. 4, I show a modified arrangement, but which, however, operates in a similar manner to that shown in Fig. 1. The circuit 1, 1, displacer 9, liquid 10, battery 11, resistance 12 and circuit 13 are provided as before. I, however, provide a different variable resistance device which consists of a mercury bath 31 and a pivoted member 32 carrying a plurality of metallic contact points 33 arranged to dip into the mercury bath as the member 32 is oscillated about its pivot 34. The contact points 33 are connected at their upper ends by resistances 35. A spring 36, adjustable by thumb screw 37, holds or tends to hold the member 32 in a retracted position with the contact points 33 out of the mercury. The displacer or hydrometer 9 is connected to the member 32 by a wire 38 and one of the terminals of the circuit 1, 1, is connected to the member 32 at the pivot 34 which is electrically connected with the farthest resistance 35. Instead of an ordinary voltmeter 14 I show in this modification a recording voltmeter 39 which may be of any well known type. It will also be understood that the recording meter 39 may be used with any of the other arrangements shown, if so desired. As the displacer 9 moves up or down responsive to changes in the battery condition more or less of the resistances 35 are included in the circuit 1, 1. This varies the voltage across the circuit 13, 13, and the recording meter registers the condition of the battery.

Fig. 5 shows another modification in which the variable resistance consists of a flexible resistance wire 40 arranged over a pulley 41, one end hanging vertically and supporting the displacer 9, and the other end connected to one side of the circuit 1, 1, at 42 and to a spring 43, adjustably secured by a thumb screw 44. The other side of the circuit 1, 1, is connected to the wire 40 through the pulley 41. In this modification the meter 45 is connected in series in the circuit 1, 1, and an adjustable shunt resistance 46 is provided across the circuit 1, 1, between the meter 45 and the resistance 12. As the displacer 9 moves up or down responsive to changes of battery condition the length of the wire 40 across the circuit 1, 1, is varied and consequently the current through the meter 45 is varied accordingly. The meter 45 will, therefore, indicate the condition of change of the battery.

Referring to Fig. 6, I show a variable resistance arrangement consisting of a straight suspension resistance wire 47 carrying the displacer 9 and resiliently supported from a spring 48. The spring 48 is adjustably held in position by a thumb screw 49. One terminal of the circuit 1, 1, is fixedly connected to the resistance wire 47 at 50. The other terminal of the circuit 1, 1, forms electrical connection with the resistance wire 47 by means of a resilient contact terminal 51. As the displacer 9 moves up or down the length of wire 47 between the point 50 and the contact 51 varies, thus varying the resistance of the circuit 1, 1, to vary the voltage at the circuit 13, 13, and cause the recording meter 39 to make indications responsive to variations in the battery condition.

Referring to Fig. 7, I show a somewhat different embodiment of certain of my improvements. In this embodiment the displacer 9 is suspended by a wire 52 from a spring 53 which in turn is suspended by a wire 54 arranged to be coiled upon a drum 55. The drum 55 may be rotated through gears 56 and 57 by means of a motor 58. Also mechanically connected to the shaft of the motor 58 and arranged to be rotated thereby is a cylinder 59 made of insulating material and having coiled thereupon a resistance wire 60. 61 represents a contact member carrying a contact point which is arranged to follow between the turns of the wire 60 as the cylinder 59 rotates. The contact member 61 may be arranged to slide along a guideway 62 as shown, or the contact member 61 may remain stationary and the cylinder 59 be given a longitudinal movement as it is rotated. 63 represents a pivoted member carrying a double contact point 64 arranged to contact with either of two contact pieces 65 and 66. The pivoted member 63 is oscillated by the movement of the wire 52 which is connected to the member 63 opposite the end at which it is pivoted, by means of an extension 67. The motor 58 has two field windings with one common terminal 68. The other terminals to the field windings are respectively 69 and 70. The switch lever 63 is arranged to connect either one of the terminals 69 or 70 with one of the supply mains 71, by means of circuits 72 and 73, and contact members 65 and 66, the lever 63 being pivoted and connected to the main 71 at 74. The other supply main 75 is connected to the motor terminal 68. That portion of the resistance wire 60 between the contact point of member 61 and the terminal 76 is included in a circuit 77 in series with a meter 78, the circuit 77 being connected to the supply mains 71 and 75 as shown.

In operation if the battery condition should change so as to cause the displacer or hydrometer 9 to rise the wire 52 will bring the switch contact 64 against the contact member 65 thereby throwing one of the motor fields in circuit to cause the motor to rotate to unwind the wire on the drum 55 until the displacer is brought back substantially to its original position thereby opening the circuit 72 and stopping the motor. Under these circumstances the motor will have imparted a certain number of revolutions to the cylinder 59 thereby changing the length of resistance wire 60 which is in circuit with the meter 78 to vary the current through the meter 78. This will cause the meter to assume a new reading which will be indicative of the battery condition, and any further change of battery condition in the same direction will act to produce a corresponding change in the meter reading. If the condition of the battery charge should change in the opposite direction the switch contact 64 will contact with the member 66 thereby reversing the field of the motor causing it to wind up the wire 54 until the displacer has been brought to its original position. During this operation the motor will rotate the cylinder 59 to vary the current through the meter 78 in the opposite direction so that the meter will again properly indicate the condition of charge of the battery. These operations may be continued indefinitely so that the meter 78 will always indicate the condition of the battery.

From the above it will be clear that I have provided arrangements which have all the advantages above pointed out and which are exceptionally useful and efficient for the purposes described.

Although I have described my improvements in great detail and with respect to several modifications I do not desire to be limited thereto since various other modifications and changes will be apparent to one skilled in the art without departing from the spirit and scope of my invention; but, Having fully and clearly described my invention, what I claim and desire to secure by Letters Patent, is:

1. In an arrangement of the class described, the combination of a storage battery or cell, an electrical circuit, a recording meter connected across said circuit, two resistances connected in said circuit, means arranged to bridge said resistances means for supporting said bridging means and a displacer movable with said bridging means, said displacer operating responsive to variations in the specific gravity of the battery.

2. In a device of the class described, the combination of an indicator, an electrical circuit, including a variable resistance arrangement, said arrangement consisting of two resistance wires connected in series in said circuit, and spring supported means for bridging said wires, and a displacer operating said means.

3. In an arrangement of the class described, the combination of a storage battery, an indicator, an electrical circuit, including a variable resistance arrangement, said arrangement embracing two resistance wires connected to said circuit, a member for bridging said wires electrically, and means for adjusting said member, and means for operating said member responsive to changes of battery condition.

4. In an arrangement of the class described, the combination of a storage battery, an indicator, an electrical circuit, including a variable resistance arrangement, said arrangement embracing a plurality of resistance wires, means for holding said wires taut, and a spring supported member for electrically bridging said wires, and a displacer for operating said member responsive to changes of battery condition.

5. The combination of a storage battery, a substantially constant potential electrical circuit, a resistance in said circuit, a variable resistance arrangement in said circuit, an indicating meter connected across said circuit between said resistances, said variable resistance arrangement embracing two resistance wires held taut by resilient means, a spring supported member for electrically bridging said wires, and means for adjusting said member, and a displacer supported by said member for moving the same responsive to changes in the condition of the battery.

In testimony whereof, I have signed my name to this specification, in the presence of two subscribing witnesses.

EDWARD VAN WAGENEN.

Witnesses:
 HARRY S. KOCH,
 S. H. EVERETT, Jr.